United States Patent Office 3,032,562
Patented May 1, 1962

3,032,562
PROCESS FOR THE RECOVERY OF 7-DEHYDROSTEROLS
Howard Klein, Brooklyn, N.Y., and Roland Kapp, Williamsport, Pa., assignors to Nopco Chemical Company, Newark, N.J., a corporation of New Jersey
No Drawing. Filed Feb. 8, 1961, Ser. No. 87,780
19 Claims. (Cl. 260—397.2)

This invention relates to an improved process for producing 7-dehydrosterols and more particularly to an improved process for the dehydrohalogenation of halogenated sterol compounds.

Since the discovery by Ziegler (Annalen, 551, 80–119) that the halogenation of organic compounds at a carbon atom alpha to a double bond could be accomplished by using compounds such as N-halogenated acid amides and imides as halogenating agents, a great deal of research has been carried out on the application of this reaction to the production of 7-dehydro derivatives of various sterol compounds. The greater part of this work has been directed to the production of 7-dehydrocholesterol. As is well known, 7-dehydrocholesterol is readily converted to vitamin $D_3$ by irradiation with ultra-violet light. In order to form 7-dehydrocholesterol from the halogenated cholesterol compounds produced in accordance with the Ziegler process, it is necessary to subject the halogenated sterol compounds to dehydrohalogenation with a suitable dehydrohalogenating agent. The compounds which have been most frequently employed to react with the halogenated sterol derivatives to effect dehydrohalogenation are organic compounds such as dimethylaniline, diethylaniline, collidine and quinoline. Compounds such as triethylamine, N,N-dipropylaniline, N-ethyl-piperidine and N,N-diethycyclohexylamine have also been employed for this purpose. More recently U.S. Patent No. 2,546,787, Ruigh et al., March 27, 1951, and U.S. Patent No. 2,546,788, Schaaf, March 27, 1951, have disclosed the use of quinaldine for this purpose. The use of this compound has made possible the realization of increased yields of 7-dehydrocholesterol of greater purity than could be obtained prior to the use of quinaldine as a dehydrohalogenation agent. However, like others of the previously known dehydrohalogenating agents, quinaldine is not as readily available as is desirable and it is expensive to use because of its high initial cost.

For example, in U.S. Patent No. 2,546,788, referred to hereinabove Example XII clearly illustrates the deleterious effects which impurities have on the effectiveness of quinaldine as a dehydrohalogenating agent. In the example quinaldine which had only 2.5 percent impurities was used to dehydrohalogenate crude 7-bromocholesteryl benzoate. The resulting 7-dehydrocholesterol had a purity of only 59.7 percent and yielded only 61.1 percent of the desired 7-dehydrocholesterol. Therefore, it is readily seen that to be effective as a dehydrohalogenating agent, quinaldine must be in a very pure state. Also, quinaldine will deteriorate on standing since it is subject to air oxidation. In addition it is rather hydroscopic and precautions must be taken to keep it relatively free of moisture in order to obtain the best results. These disadvantages greatly limit the use of quinaldine as a dehydrohalogenation agent owing to the need for purifying the quinaldine to obtain a very pure material prior to use in these processes. Thus the purchase and storage of large quantities of quinaldine when the market price is low, for later use, is rendered impractical.

Comparatively few attempts have been made by the prior art to use inorganic materials, such as the metal salts or metal hydroxides, or organo-metallic compounds, such as sodium acetate, as dehydrohalogenating agents. Those attempts which have been made have been relatively unsuccessful inasmuch as the yields realized were negligible and the products obtained were not of a high degree of purity. That is, dehydrohalogenation processes carried out using such agents have generally resulted in the decomposition of the halogenated sterol compound with attendant darkening of the reaction mixture and the evolution of hydrogen halide. For these reasons the principal offorts of the prior art have been directed towards the development of various organic reagents for use in effecting the dehydrohalogenation of halogenated sterol compounds.

U.S. Patent No. 2,846,829, Klein et al., December 16, 1958 discloses the use of alanate salts such as alkali metal and alkaline earth metal salts of $\alpha$-alanine and $\beta$-alanine as dehydrohalogenation agents, for dehydrohalogenating halogenated sterol compounds. These salts are very expensive and cannot be directly reused, since they are converted to free alanine, unless they are reconverted. Hence, for reuse, it is necessary to convert the alanine to the desired salt. Furthermore these salts are heterogeneous catalysts which are very sensitive and therefore tend to give results which are not reproducible.

It is the object of this invention to provide a new and valuable improvement in the process for producing 7-dehydrosterols.

It is a further object of this invention to provide a new and highly improved process for the dehydrohalogenation of halogenated sterol derivatives using a readily available and highly effective dehydrohalogenating agent.

Other objects of the invention will in part be obvious and will in part appear hereinafter.

We have discovered that the above and other objects of the invention may be realized if the dehydrohalogenation of a halogenated sterol compound is effected by reacting the halogenated sterol compound with either a quinaldine formamide complex or a quinaldine urea complex. The yields of the desired 7-dehydrosterol compounds which are obtained in this manner are substantially higher or as high as when the dehydrohalogenation is carried out in accordance with the procedures of the prior art. Furthermore, the products which are obtained according to the process described herein are generally of considerably higher purity than the products obtained when the dehydrohalogenation is carried out in accordance with the procedures of the prior art. Moreover, both the quinaldine urea complex and the quinaldine formamide complex are very stable complexes which will not deteriorate on standing. Upon completion of the dehydrohalogenation of the halogenated sterol as outlined above, pure quinaldine can be recovered and directly used as a dehydrohalogenating agent by the procedures outlined in U.S. Patent No. 2,546,787, Ruigh et al., March 27, 1951, and U.S. Patent No. 2,546,788, Schaaf, March 27, 1951. When the quinaldine urea complex is used as a dehydrohalogenating agent as outlined above, urea may be recovered from the reactants as urea nitrate.

As pointed out previously, when quinaldine itself is used as a dehydrohalogenating agent it must be in a very pure state to dehydrohalogenate halogenated sterol compounds effectively. Hence, it was unexpected to find in accordance with our invention that complexes of quinaldine with urea or formamide are effective dehydrohalogenating agents. This is further surprising since other complexes formed by quinaldine, such as the complex formed by thiourea and quinaldine, are ineffective in accomplishing these dehydrohalogenations. As we have stated above, it is possible to obtain considerably higher yields or as high yields of the desired 7-dehydrosterol compound by effecting the dehydrohalogenation of the halogenated sterol compound by merely reacting the desired halogenated sterol compound with quinaldine formamide complex or quinaldine urea complex. The yields obtained in this manner are often higher by as much as 50% or more than the yields obtained when the dehydrohalogenation is carried out in using some of the prior art dehydrohalogenating agents referred to above. The yields obtained by using quinaldine formamide complex or quinaldine urea complex are as high as the yields obtained when pure quinaldine itself is used. However when both the quinaldine formamide complex and the quinaldine urea complex are used as dehydrohalogenating agents, they do not need to be purified. Due to the severe deterioration of pure quinaldine on storage, it must be purified if it has been standing for a protracted period of time. Such purification steps are costly and time consuming.

The amount of quinaldine formamide complex or quinaldine urea complex which is employed in the reaction should be sufficient, of course, to react completely with the halogenated sterol compound which is to be dehydrohalogenated, i.e. at least a mole to mole ratio should be employed. As a matter of convenience, it is usually preferred to use an excess of quinaldine formamide complex or quinaldine urea complex over the amount theoretically required to bring about the dehydrohalogenation of the halogenated sterol. Thus from about three moles to about six moles of quinaldine formamide complex or quinaldine urea complex per mole of halogenated sterol compounds are conveniently employed. Larger amounts of quinaldine formamide complex or quinaldine urea complex per mole of halogenated sterol compound may be employed, if desired, but the use of such larger amounts is not necessary. In order to obtain the most consistent results, it is preferred that quinaldine formamide complex or quinaldine urea complex be used in a reasonably pure state.

The quinaldine formamide complex which is used in this invention may be produced by reacting equimolar proportions of quinaldine and formamide and recovering the complex so formed. The quinaldine used in the preparation of the quinaldine formamide complex may contain large amounts of impurities. The quinaldine formamide complex may even be formed by reacting formamide with commercial mixtures of coal tar bases which contain quinaldine and thereafter recovering the resulting precipitate of quinaldine formamide complex formed by such reaction. British Patent No. 736,589, Arnall, September 14, 1955, discloses methods of preparing and isolating the quinaldine urea complex usable in this invention. The quinaldine formamide complex and quinaldine urea complex so prepared are obtained in a high state of purity and when used as dehydrohalogenation agents to dehydrohalogenate halogenated sterol compounds, yield quinaldine. The quinaldine so obtained is itself in a high state of purity and can be used directly to effect the dehydrohalogenation of halogenated compounds.

Furthermore, the quinaldine formamide complex and quinaldine urea complex used in this invention act as homogeneous catalysts and enable us to obtain uniform results, no matter what the method of preparation of these complexes is used. Therefore, this invention is not limited by the source of or means of preparing these complexes. When the quinaldine formamide complex or quinaldine urea complex is prepared by the methods given above it is of a suitable purity and will consistently give excellent results when employed to bring about the dehydrohalogenation of a halogenated sterol compound. If desired however, quinaldine formamide complex or quinaldine urea complex containing appreciable amounts of impurities can be employed successfully in the process of the invention.

The dehydrohalogenation process of the present invention is preferably carried out in an inert hydrocarbon solvent solution of the halogenated sterol derivative and the quinaldine formamide complex or quinaldine urea complex used. Among the many such hydrocarbon solvents which are suitable for use in our novel process there may be mentioned benzene, toluene, xylene, methyl isopropyl benzene, isopropyl benzene, ethyl benzene, diethyl benzene, mesitylene, butyl benzene, amyl benzene, naphthalene, pinene, heptane, octane, petroleum ether, dichloroethane, chlorobenzene, cyclohexane, etc. The amount of solvent when used preferably should be at least about equal to the volume of the halogenated sterol derivative and the quinaldine formamide complex or the quinaldine urea complex. Generally, the most satisfactory results are obtained when the volume of the solvent which is employed is from about 5 to 15 times as great as the volume of the quinaldine formamide complex or quinaldine urea complex which is employed. If desired, ratios of solvent to quinaldine formamide complex or quinaldine urea complex greater than 15 to 1 may be employed though such higher ratios are not necessary. In the preferred embodiment of our invention, we use xylene as a solvent.

In carrying out the process of the invention, it is necessary to heat the mixture of quinaldine formamide complex or quinaldine urea complex and halogenated sterol compound in order to bring about dehydrohalogenation. In most cases, it is preferred to heat the reaction mixture to a temperature of about 90° C. to 100° C., e.g., on a steam bath. The reaction can be carried out, however, at temperatures between about 80° C. to about 150° C. and temperatures higher than 150° C. can be employed if desired, although such higher temperatures are not required. The length of time of heating the reaction mixtures will vary somewhat depending upon the temperature at which the reaction is carried out. We prefer to heat for about 3 hours when a temperature of about 90° C. is maintained. At higher temperatures, shorter periods of heating may be employed.

After the dehydrohalogenation reaction has been accomplished, the desired 7-dehydrosterol may be recovered from the dehydrohalogenation reaction mixture in any convenient manner. The exact method employed for isolating the 7-dehydrosterol compound will depend to some extent upon the specific derivative of the sterol employed as the starting material in the process. It is quite well known that a sterol compound prior to being subjected to halogenation in accordance with the Ziegler process must be treated in some manner or other so as to convert the hydroxyl group on the 3 position to a group which will not be deterimentally affected by the halogenating agent but which can conveniently be reconverted to a hydroxyl group. Thus the hydroxyl group may be converted to an ester group or to an ether group or it may be replaced with any other suitable inactive group which may later be split off with reformation of the hydroxyl group at the 3 position. The most common practice in the prior art and what appears to be the most suitable and most feasible practice is to convert the hydroxyl group to an ester group by esterification with an efficient esterifying agent such as acetic anhydride, benzoyl chloride, or the like. If the sterol compound has been converted to an ester thereof, the sterol is reformed by a simple hydrolysis of the ester group by saponification with alcoholic alkali. One practice in the prior art as shown by British Patent No. 574,432 and by U.S. Patent No. 2,441,091 and its French counterpart, French Patent No. 901,551 has been to remove the dehydrohalogenating agent from the reaction mixture prior to carrying out the saponification of the ester of the sterol compound. This is accomplished according to these prior art patents either by a process involving admixing the reaction mixture with an excess of an aqueous acid solution and extracting this mixture with a solvent such as ether or a hydrocarbon solvent to remove the 7-dehydrosterol ester from the aqueous mixture or it is accomplished by a process involving the admixture of the dehydrohalogenation reaction mixture with an excess of a water-immiscible solvent such as petroleum ether and then extracting that mixture with an aqueous acid solution to remove the dehydrohalogenation agent from the solvent solution. In either case the solvent solution containing the 7-dehydrosterol ester is then washed with a dilute alkali solution to remove any acid dissolved in the solvent and thereafter the solvent solution is washed with water to remove any alkali dissolved in the solvent. Thereafter, the solvent is evaporated to recover the 7-dehydrosterol ester since the solvent which has been used in separating the ester from the dehydrohalogenation reaction mixture is generally a solvent which is not well suited as a vehicle in which to carry out the saponificaion of the ester to form the free sterol. After the ester has been isolated it is then hydrolyzed with an alcoholic alkali solution. In all of the specific examples given hereinafter, the general procedure of the prior art is employed to separate the crude 7-dehydrosterol esters from the dehydrohalogenation reaction mixtures containing the ester.

This was accomplished by washing the solvent solution of the dehydrohalogenation mixture with an aqueous acid solution of a 1 to 1 mixture of concentrated hydrochloric acid to remove all acid soluble and water soluble components such as any excess quinaldine urea complex or quinaldine formamide complex, and any quinaldine, urea, formamide and halogen salt formed by the dehydrohalogenation of the 7-bromocholesteryl benzoate. Thereafter the solvent solution of the sterol ester was admixed with acetone which is readily adapted for crystallizing the sterol ester. The solution containing the solvent solution of the 7-dehydrocholesteryl benzoatae and acetone was then cooled to a relatively low temperature from about $-5°$ C. to about $-10°$ C. overnight which resulted in complete crystallization of the sterol ester. Thereafter the crystallized ester was recovered by a simple filtration procedure. The sterol ester may then be hydrolyzed in the same fashion as in the prior art procedures to get the 7-hydrosterol.

Other means of recovering the 7-dehydrosterol can, of course, be employed. However, in commercial practice, it is preferable to carry out the saponification of the esters in accordance with the process which is disclosed in U.S. Patent Number 2,542,291, Schaaf, February 20, 1951. This process eliminates entirely the separation of the 7- dehydrosterol ester from the dehydrohalogenating agent prior to effecting the saponification of the ester. Instead, the saponification is carried out directly in the reaction mixture obtained from the dehydrohalogenation reaction by dissolving the dehydrohalogenation reaction mixture in an excess of an alcoholic alkali solution wherein the alcohol is one containing not more than 4 carbon atoms, saponifying the 7-dehydrosterol ester in the resulting mixture, and cooling the solution to a temperature somewhat below room temperature whereupon the free 7-dehydrosterol crystallizes from the solution in a relatively high state of purity. Any other suitable means of carrying out the saponification of 7-dehydrosterol esters can, of course, be employed.

As mentioned above, it is common practice to block the hydroxyl group on the 3 positon of the sterol compounds during the halogenation reaction by converting the hydroxyl group to a group which will not react with the dehydrohalogenating agent but which may be later reconverted to the hydroxyl group. For convenience, the term "inactive group" will be used herein in referring to such a group. For the purposes of the present invention, it is of course, entirely immaterial just what inactive group is used to protect the 3 position of the sterol compound since the reaction between the halogenated sterol compound and the quinaldine formamide complex or the quinaldine urea complex involves, of course, the removal of the halogen atom from the 7 position on the sterol compound and the removal of the hydrogen atom from the 8 position of the sterol compound.

The specific examples given hereinafter show the use of the halogenated benzoate esters of cholesterol in the process of the invention. These examples are only illustrative and the reaction which takes place between this halogenated ester and the quinaldine formamide complex or the quinaldine urea complex takes place with equal efficiency and ease between the quinaldine formamide complex or the quinaldine urea complex and any other sterol compound having a double bond between the 5 and 6 carbon atoms and a halogen atom on the 7 carbon atom. Thus the process of our invention is quite suitably for and is very effective in dehydrohalogenating any sterol compounds of this nature regardless of whether they are the esters, the ethers or any other suitable derivatives of the particular sterol compound being dehydrohalogenated. Furthermore, as far as the esters are concerned, any of the various sterol esters which may be formed can be dehydrohalogenated by the process of our invention. Among the sterol esters which have been utilized in the prior art patents and which are quite suitable for use in the process of our invention, there may be mentioned the formate, the oxalate, the propionate, the butyrate, and the stearate esters of the halogenated sterol compounds as well as the acetate and benzoate esters thereof.

For a fuller understanding of the nature and objects of the invention, reference may be had to the following examples which are given merely as further illustrations of the invention and are not to be construed in a limiting sense.

The purity of all products when listed in the following examples was obtained by spectographic analysis, all points on the spectrographic curve falling in line with the desired product.

*Example I*

To a refluxing solution of 18.1 g. of quinaldineformamide complex in 125 ml. of xylene was added 25 g. of crude 7-bromocholesteryl benzoate in one portion. After the reaction had proceeded for one and a quarter hours, the solution was cooled to 45° C. and the basic and water soluble materials removed by washing with a 1:1 solution of concentrated hydrochloric acid in water. The resulting 7-dehydrocholesteryl benzoate was precipitated by mixing the xylene solution with 800 ml. of acetone and chilling overnight at a temperature of from between $-5°$ C. to $-10°$ C. A yield of 11.3 grams of 7-dehydrocholesteryl benzoate having a purity of 83.4% was obtained.

*Example II*

To a refluxing solution of 20 g. of quinaldine-urea complex (M.P. 173–5) in 125 ml. of xylene was added 25 g. of crude 7-bromocholesteryl benzoate. After the reaction had proceeded for 75 minutes, the solution was cooled to 45° C. and the basic and water soluble materials removed by washing with a 1:1 solution of concentrated hydrochloric acid and water. The resulting 7-dehydrocholesteryl benzoate was precipitated by mixing the xylene solution with 800 ml. of acetone and chilling overnight at a temperature of from between $-5°$ C. to $-10°$ C. A yield of 13.2 grams of 7-dehydrocholesteryl benzoate having a purity of 78.3% was obtained.

*Example III*

An essentially dry solution of quinaldine was prepared as follows: a mixture of 20.6 g. of quinaldine formamide complex, 175 ml. of xylene and 35 ml. of water was warmed on a steam bath for one half hour. The two phase system was cooled and the water separated. By azeotropically distilling off 50 ml. of xylene the resulting solution of quinaldine and xylene was rendered essentially dry.

To this xylene solution of quinaldine was added 25.0 g. of crude 7-bromocholesteryl benzoate and the xylene mixture was refluxed for 75 minutes. The refluxed mixture was cooled to 45° C. and washed three times with 35 ml. of a 1:1 solution of concentrated hydrochloric acid and water and finally three times with 25 ml. of warm water.

The xylene solution was added to 800 ml. of acetone and chilled overnight at −5° C. to −10° C. The crystals that separated were filtered, washed with cold acetone and dried. A yield of 13.5 grams of 7-dehydrocholesteryl benzoate having a purity of 92% was obtained.

*Example IV*

An essentially dry solution of quinaldine was prepared as follows: a mixture of 100 g. of quinaldine-urea complex, 200 ml. of water and 40 g. of sodium chloride was heated on a steam bath. The water was separated and the quinaldine layer washed three times with a hot saturated salt solution and dried over $Na_2SO_4$. In this fashion, 60 g. of quinaldine was obtained.

A 12.5 g. portion of the recovered quinaldine was mixed with 125 ml. of xylene and brought to reflux. To this was added 25 g. of crude 7-bromocholesteryl benzoate and reflux continued for 75 minutes. The xylene solution was added to 800 ml. of acetone and chilled overnight at a temperature from between −5° C. to −10° C. A yield of 11.7 grams of 7-dehydrocholesteryl benzoate was obtained having a purity of 89%.

In Examples III and IV, quinaldine was obtained from the quinaldine urea complex and quinaldine formamide complex and then used as a dehydrohalogenating agent. This was done to illustrate that the quinaldine so obtained is in a highly purified state. The purity of the 7-dehydrocholesteryl benzoate obtained in this manner is actually higher than the purity of the 7-dehydrocholesteryl benzoate obtained when the quinaldine formamide complex and quinaldine urea complex were used as dehydrohalogenation agents. This illustrates another advantage occurring from our invention, viz., not only is a very satisfactory dehydrohalogenated product obtained from using quinaldine formamide and quinaldine urea complexes which do not require any special pretreatment or purification as in the case of quinaldine, but also, one of the products of the process is a very pure quinaldine which can be directly used in further procedures without need for further treatment. Therefore it is readily apparent that the use of quinaldine formamide complex and quinaldine urea complex when used as dehydrohalogenation agents have many advantages. First they themselves are excellent dehydrohalogenation agents and do not require purification before use. Secondly their purity is not affected by storage, exposure to light or air and hence no pretreatment is required before they are used. Thirdly, when they are used as dehydrohalogenating agents in accordance with our invention, a highly purified quinaldine is a resultant product, which itself may be directly used as a dehydrohalogenating agent.

From the above illustrative examples and the general description of the invention given herein, it is readily apparent that the present invention provides an excellent process for the dehydrohalogenation of halogenated sterol compounds and one which can be successfully carried out using a highly satisfactory and readily available dehydrohalogenating agent. Although the detailed examples hereinabove have dealt with the treatment of esters of cholesterol, the process of our invention can be applied to the treatment of any esters of any similar sterol or to any other sterol derivative in which the 3 position is protected by some other inactive group on the 3 position besides the ester group such as, for example, an ether group. The particular inactive group which is at the 3 position to protect that position from attack throughout the process of converting the sterol to a 7-dehydrosterol is entirely unimportant as far as the process of our invention is concerned inasmuch as the particular group which is on the 3 position in no way enters into the reaction which occurs between the halogenated sterol compound and the quinaldine formamide complex or the quinaldine urea complex. Consequently the process of our invention is applicable to the dehydrohalogenation of any sterol derivative having an inactive group on the 3 position and having a double bond between the 5 and 6 carbon atoms and a halogen on the 7 carbon atom. As pointed out hereinabove, the free quinaldine formed during the dehydrohalogenation reaction and the excess quinaldine formamide complex or quinaldine urea complex can be readily recovered from the reaction mixture and reused as dehydrohalogenating agents. Thus there is little or no loss of the dehydrohalogenating agent and it can be used repeatedly. Thus our process is highly economical.

Having described our invention, what we claim as new and desire to secure by Letters Patent is:

1. In a process for producing a 7-dehydrosterol, the step which comprises heating a halogenated sterol derivative selected from the group consisting of halogenated sterol esters and halogenated sterol ethers which has a double bond between the 5 carbon atom and the 6 carbon atom and which has a halogen atom attached to the 7 carbon atom, at a temperature of at least about 80° C. in the presence of a dehydrohalogenation agent selected from the group consisting of quinaldine formamide complex and quinaldine urea complex.

2. The process of claim 1, wherein said halogenated sterol derivative and said dehydrohalogenation agent are heated in inert solvent.

3. The process of claim 2, wherein said inert solvent is xylene.

4. In a process for producing a 7-dehydrosterol, the step which comprises heating a halogenated sterol ether which has a double bond between the 5 carbon atom and the 6 carbon atom and which has a halogen atom attached to the 7 carbon atom, at a temperature of at least about 80° C. in the presence of a dehydrohalogenation agent selected from the group consisting of quinaldine formamide complex and quinaldine urea complex.

5. The process of claim 4, wherein said halogenated sterol ether and said dehydrohalogenation agent are heated in an inert solvent.

6. The process of claim 5, wherein said inert solvent is xylene.

7. In a process for producing a 7-dehydrosterol, the step which comprises heating a halogenated sterol ester which has a double bond between the 5 carbon atom and the 6 carbon atom and which has a halogen atom attached to the 7 carbon atom, at a temperature of at least about 80° C. in the presence of a dehydrohalogenation agent selected from the group consisting of quinaldine formamide complex and quinaldine urea complex.

8. The process of claim 7, wherein said halogenated sterol ester and said dehydrohalogenation agent are heated in an inert solvent.

9. The process of claim 8, wherein said inert solvent is xylene.

10. The process of claim 8, wherein said dehydrohalogenation agent is quinaldine formamide complex.

11. The process of claim 8, wherein said dehydrohalogenation agent is quinaldine urea complex.

12. The process of claim 8, wherein said halogenated sterol ester is an ester of cholesterol.

13. The process of claim 12, wherein said ester of cholesterol is 7-bromocholesteryl propionate.

14. The process of claim 12, wherein said ester of cholesterol is a benzoate ester of cholesterol.

15. The process of claim 14, wherein said ester of cholesterol is 7-bromocholesteryl benzoate.

16. The process of claim 12, wherein said ester of cholesterol is an acetate ester of cholesterol.

17. The process of claim 16, wherein said ester of cholesterol is 7-bromocholesteryl acetate.

18. In a process for producing 7-dehydrocholesterol the step which comprises refluxing 7-bromocholesteryl benzoate in the presence of quinaldine formamide complex and xylene and thereafter recovering 7-dehydrocholesteryl benzoate.

19. In a process for producing 7-dehydrosterol the step which comprises refluxing 7-bromocholesteryl benzoate in the presence of quinaldine urea complex and xylene, and thereafter recovering 7-dehydrocholesterol benzoate.

No references cited.